Feb. 3, 1925.
P. R. ORD
POLARIMETRIC APPARATUS
Filed May 12, 1923
1,525,145
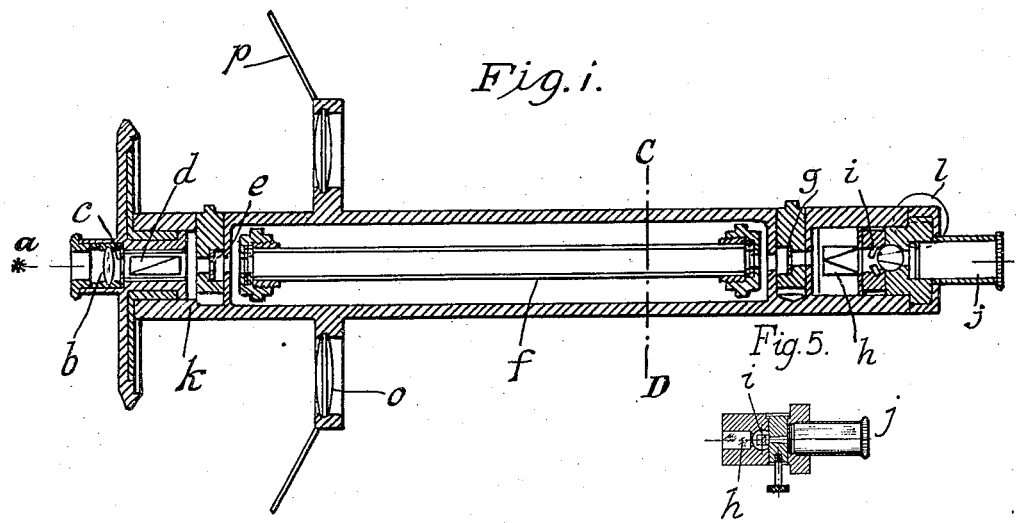
Fig. 1.
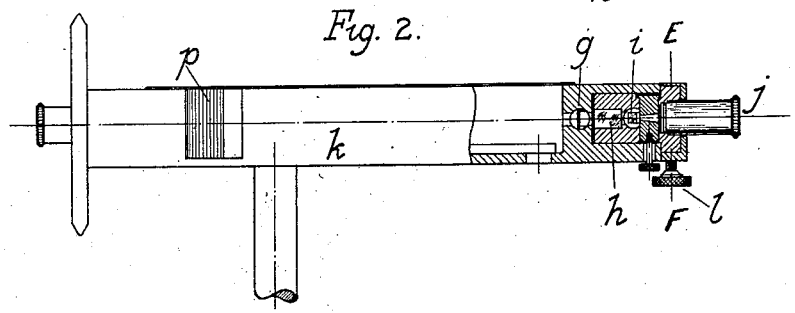
Fig. 2.
Fig. 5.
Fig. 6.
Fig. 7.
Fig. 8.
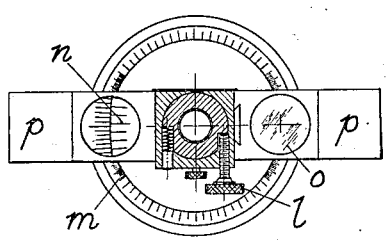
Fig. 4.
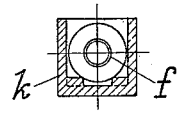
Fig. 3.
INVENTOR:
P. R. ORD,
By his Attorneys, Patented Feb. 3, 1925.

1,525,145

UNITED STATES PATENT OFFICE.

PERCY ROBERT ORD, OF LONDON, ENGLAND, ASSIGNOR TO ADAM HILGER, LIMITED, OF LONDON, ENGLAND.

POLARIMETRIC APPARATUS.

Application filed May 12, 1923. Serial No. 638,520.

*To all whom it may concern:*

Be it known that I, PERCY ROBERT ORD, a subject of the King of Great Britain, residing at 75A, Camden Road, London, England, have invented new and useful Improvements in Polarimetric Apparatus, of which the following is a specification.

In apparatus for measuring the optical rotation, namely, the rotation of the plane of polarization of a substance, it is customary to allow a beam of light polarized in a fixed and known plane by a polarizing prism known as a polarizer to pass through a known length of the substance, as, for instance, a sample of liquid contained in a tube having transparent ends. The rotation is then measured by the examination of the resultant beam of light by a second polarizing prism known as the analyzer which is mounted so as to rotate about the optical axis of the apparatus and is provided with means for measuring its rotation. When using the instrument the position of the analyzer for extinction of the light is first ascertained, the substance is then introduced and the position of the analyzer when extinction of light takes place is again ascertained. The rotation of the analyzer from one position to the other is the optical rotation of the substance.

Various devices have been used with the polarizer in order to obtain more accurate setting, for example, the Lippich two field system in which two polarizing prisms are so arranged that the field is divided into two portions whose planes of polarization are slightly inclined to each other. In this case the light is in no orientation of the analyzer wholly extinguished in both portions of the field simultaneously but the analyzer is so adjusted that the parts of the field are made of equal intensity.

A telescope is usually provided at the eye end of the apparatus which telescope is focused on a sharp line of demarcation of the two parts of the field so that the discrimination of differences of brightness is as sensitive as possible.

The present invention relates to polarimetric apparatus in which the field is divided into at least two portions.

According to this invention no variation occurs in the focusing of the dividing line of the two parts of the field as a result of introducing the liquid or substance under observation, as the optical elements in the apparatus are so arranged that the dividing line is at the focus of the eyepiece and is not viewed at any time through the liquid or substance under observation and in such an arrangement the polarizer is preferably rotated and the analyzer is fixed (as far as observation purposes are concerned) and is combined with devices for dividing the field into two parts.

This invention possesses the advantages that the conditions of illumination and absorption of light by optical elements are exactly the same in both parts of the field and remain the same whatever the refractive index or state of homogeneity of the liquid under observation, and also that dividing line between the two parts of the field is not viewed through the liquid or substance under observation so that the observation of the dividing line and the sharpness of its focus as seen in the eyepiece are independent of the optical qualities or physical state of the liquid. Liquids therefore which are imperfectly mixed, turbed, unfiltered or unclarified so that they are in a state which does not permit of measurement by any known polarizer, can be accurately and easily measured. As is obvious, a line which could not be seen through a turbid liquid can be seen by the light transmitted through said liquid when the line is positioned adjacent the focus of the eyepiece.

The accompanying drawings illustrate polarimetric apparatus made in accordance with this invention. Figure 1 is a plan partly in section, Figure 2 is a side elevation partly in section, Figure 3 is a transverse section on the line C D Figure 1 and Figure 4 is a similar section on the line E F Figure 2. Figure 5 is a longitudinal section of the analyzer and eyepiece and Figures 6 and 7 are elevations of the Nicol prism of the analyzer. Figure 8 shows a splash glass and holder therefor.

*a* is a source of light placed at the focus of a condensing lens *b* which allows parallel rays to pass through a filter *c* of potassium bicromate, a Nicol prism *d* and a splash glass *e* to prevent splashes from falling on the prisms, a tube *f* containing the liquid to be examined, another splash glass *g*, two Nicol prisms *h*, two equally inclined plates $i$ and a low power positive eyepiece $j$, all the elements named being mounted in a casing $k$. The condensing lens $b$, filter $c$ and Nicol prism $d$ are so mounted that they can be rotated. The Nicol prisms $h$ are so constructed and mounted that their planes of polarization make any desired angle between each other, and the equally inclined plates $i$ are so arranged in relation to the Nicol prisms $h$ that a sharp dividing line between the two halves of the field is maintained at the focus of the eyepiece $j$. The Nicol prisms $h$, plates $i$ and eyepiece $j$ are so mounted as shown in Figures 2 and 4 that they can be rotated through a small angle by means of a screw $l$ so that the plane bisecting the angle between the planes of polarization of the two Nicol prisms $h$ can be rotated in either direction thus allowing of the adjustment of the zero position of a scale $m$ which is provided with verniers $n$. The scale is on the side of the circle as shown and can be conveniently read through two magnifying glasses $o$. $p$ are reflectors for reflecting light on to the scale.

Figs. 6 and 7 show the Nicol prisms in two different positions. These prisms as usual, give two parallel rays and the two inclined plates refract these rays so as to bring them together. To set the scale at zero the screw $l$ is rotated until the two halves of the field are of equal intensity, there being no liquid in the container. Adjustment is then effected, the two prism $h$ making equal angles with the plane of polarization of the polarizer.

In using the instrument the Nicol prism $d$ forming the polarizer is rotated but the Nicol prisms $h$ forming the analyzer are stationary, the advantage gained by such an arrangement being that the dividing edge or edges of the parts of the field of view retain their position unchanged as seen by the observer.

What I claim is:—

1. In polarimetric apparatus, a polarizer, an analyzer, a container for the subject under observation located between the polarizer and the analyzer, said analyzer including means for dividing the field of view into two parts.

2. In polarimetric apparatus, a polarizer, an analyzer, a container for the subject under observation located between the polarizer and the analyzer, said analyzer including means for dividing the field of view into two parts, and an eyepiece so arranged that its focus is at the dividing line of the two parts of the field of view.

3. In polarimetric apparatus, a condensing lens, a filter and a Nicol prism secured to a rotatable mount, an analyzer comprising two Nicol prisms arranged to divide the field of view into two parts, and a container for the subject under observation located between the analyzer and the rotatable mount.

4. In polarimetric apparatus, a condensing lens, a filter and a Nicol prism secured to a rotatable mount, an analyzer comprising two Nicol prisms arranged to divide the field of view into two parts, a container for the subject under observation located between the analyzer and the rotatable mount, and an eyepiece so arranged that its focus is at the dividing line of the two parts of the field of view.

5. In polarimetric apparatus, a polarizer, an analyzer, a container for the subject under observation located between the polarizer and the analyzer, said analyzer including two Nicol prisms and two inclined plates for dividing the field of view into two parts.

In testimony that I claim the foregoing as my invention I have signed my name this third day of May, 1923.

PERCY ROBERT ORD.